(12) United States Patent
Furukawa et al.

(10) Patent No.: US 6,236,915 B1
(45) Date of Patent: May 22, 2001

(54) AUTONOMOUS TRAVELING VEHICLE

(75) Inventors: Yoshimi Furukawa; Sachio Kobayashi, both of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/525,132

(22) Filed: Mar. 14, 2000

Related U.S. Application Data

(63) Continuation of application No. 09/064,192, filed on Apr. 22, 1998, now abandoned.

(30) Foreign Application Priority Data

Apr. 23, 1997 (JP) .................................................. 9-105554

(51) Int. Cl.[7] ...................................................... G06F 7/70
(52) U.S. Cl. .................................. 701/25; 701/23; 701/94
(58) Field of Search .................................. 701/23, 24, 25, 701/26, 2, 94

(56) References Cited

U.S. PATENT DOCUMENTS

| 5,853,846 | 12/1998 | Clark et al. ............................ 428/131 |
| 5,887,268 | 3/1999 | Furukawa .............................. 701/23 |

FOREIGN PATENT DOCUMENTS

| 7476977 A1 | 12/1974 | (AU) . |
| 4-328009 | 11/1992 | (JP) . |
| 7-283973 | 10/1995 | (JP) . |

OTHER PUBLICATIONS

*Abstract of Japanese Patent No. JP4328009, by Higashihara Yoshiaki, dated Nov. 17, 1992.

*Primary Examiner*—Michael J. Zanelli
*Assistant Examiner*—Eric M Gibson
(74) *Attorney, Agent, or Firm*—Arent Fox Kintner Plotkin & Kahn, PLLC

(57) ABSTRACT

In driving a motor vehicle in accordance with a control plan, the influence of the inclination of a road is recognized so as to realize an accurate control. The position and speed of a vehicle after a predetermined time period as estimated on the basis of the detection of magnetic nails, are estimated by a first processing portion, while the control plan of the vehicle (the correlation between the position and speed of the vehicle) is determined by a control plan processing portion on the basis of information received from a leakage coaxial cable. The deviations between the control plan and the estimated position and speed of the vehicle are calculated, and these deviations are further multiplied by gains $K_x$ and $K_u$ in a control plan converting portion so as to calculate a target acceleration. A throttle and a brake are controlled on the basis of the target acceleration, whereby the vehicle is driven in conformity with the controls. A correction device corrects the target acceleration in order to eliminate the influence of the inclination of a road.

6 Claims, 5 Drawing Sheets

FIG.4

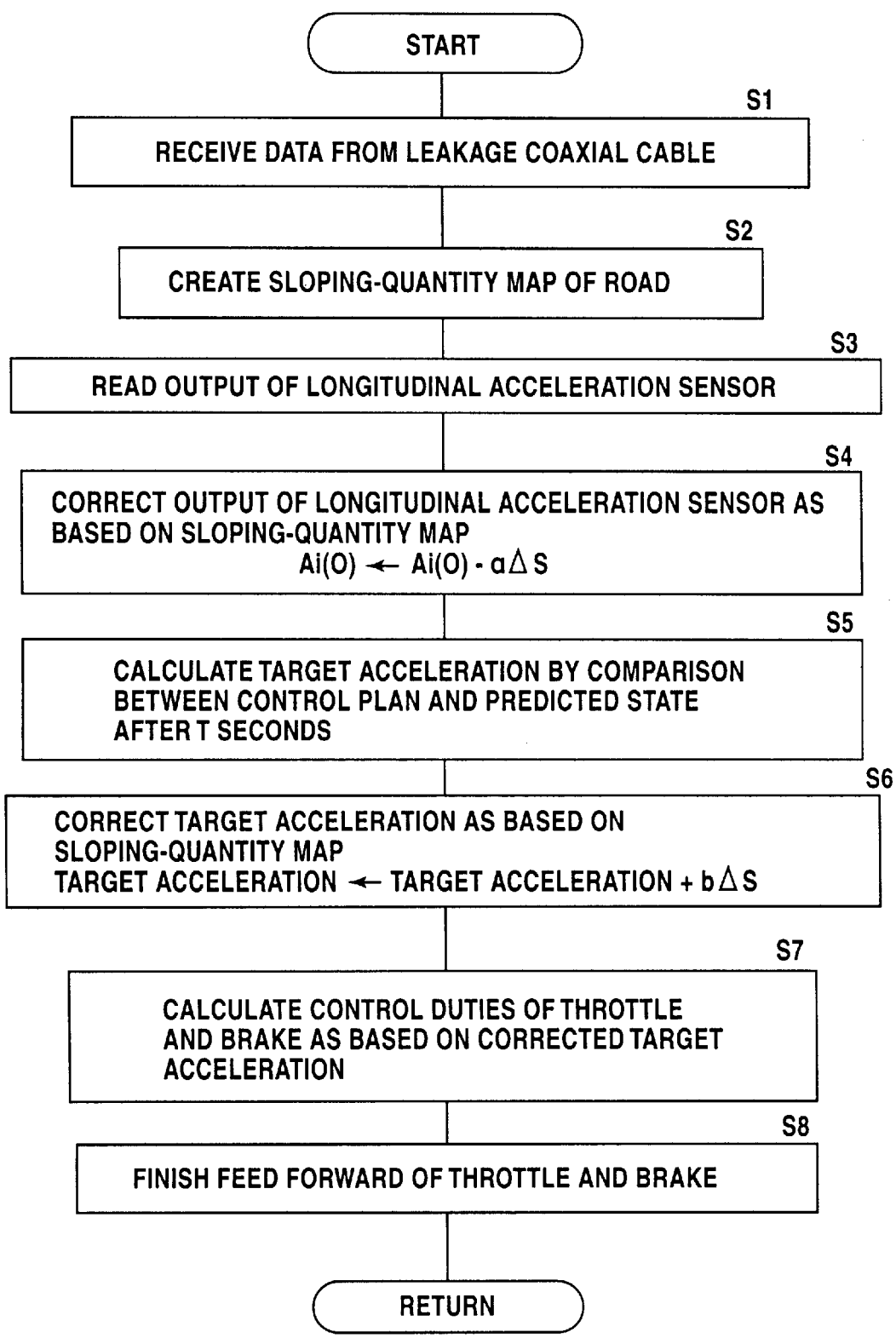

START
↓
S1 RECEIVE DATA FROM LEAKAGE COAXIAL CABLE
↓
S2 CREATE SLOPING-QUANTITY MAP OF ROAD
↓
S3 READ OUTPUT OF LONGITUDINAL ACCELERATION SENSOR
↓
S4 CORRECT OUTPUT OF LONGITUDINAL ACCELERATION SENSOR AS BASED ON SLOPING-QUANTITY MAP
$Ai(O) \leftarrow Ai(O) - a\Delta S$
↓
S5 CALCULATE TARGET ACCELERATION BY COMPARISON BETWEEN CONTROL PLAN AND PREDICTED STATE AFTER T SECONDS
↓
S6 CORRECT TARGET ACCELERATION AS BASED ON SLOPING-QUANTITY MAP
TARGET ACCELERATION $\leftarrow$ TARGET ACCELERATION $+ b\Delta S$
↓
S7 CALCULATE CONTROL DUTIES OF THROTTLE AND BRAKE AS BASED ON CORRECTED TARGET ACCELERATION
↓
S8 FINISH FEED FORWARD OF THROTTLE AND BRAKE
↓
RETURN

AUTONOMOUS TRAVELING VEHICLE

This is a continuation of Ser. No. 09/064,192 filed Apr. 22, 1998, now abandoned.

BACKGROUND OF THE INVENTION

1. Field of the Invention

The present invention relates to an autonomous traveling vehicle, and more particularly to an autonomous traveling vehicle which autonomously travels within a traffic lane by utilizing positional information from magnetic information sources which are mounted on a road.

2. Description of the Prior Art

Such an autonomous traveling vehicle has already been proposed by the assignee of the present application (refer to Japanese Patent Application No. 7-283973). With the prior art vehicle, the position and speed of the vehicle after a predetermined time period as estimated on the basis of the detection of magnetic nails, are compared with a control plan concerning the position and speed of the vehicle as set on the basis of information received from a leakage coaxial cable, whereby the vehicle is driven in accordance with the control plan by controlling a throttle and a brake so as to diminish the deviations of the comparison. The controlled amounts of the throttle and the brake which are determined on the basis of the magnitudes of the deviations, are set assuming that the road is flat. Therefore, when the road is sloping, it becomes difficult to drive the vehicle in accordance with the control plan. By way of example, in the case where the vehicle falls behind the control plan, the throttle is opened to increase the vehicle speed. Since, however, the quantity of opening of the throttle on that occasion is set assuming a flat road, the vehicle speed does not increase as expected, on a road of an ascending slope, so that the deviations cannot be diminished.

SUMMARY OF THE INVENTION

The present invention has been made in view of the above circumstances, and it has for its object to eliminate the influence of the inclination of a road and realize precise control for driving a motor vehicle in accordance with a control plan.

In order to accomplish the above object, an autonomous traveling vehicle having acceleration/deceleration actuators comprises a vehicle position detection means for detecting the position of the vehicle on the basis of information received from information sources disposed on a road. A control plan processing means creates a control plan formed of correlation data of speed and distance, on the basis of at least one of the information received from a preceding vehicle and the information received from information transmission means disposed on or near the road. A deviation calculation means calculates at least one of a distance deviation and a speed deviation at an anticipated arrival point of the vehicle after a predetermined time period, on the basis of the control plan and the vehicle position. A vehicle-speed control means controls the accelerating/decelerating actuators, on the basis of at least one of the distance deviation and the speed deviation. Correction means corrects at least one of the distance deviation and the speed deviation in order to compensate for any deviation due to a gradient of the road, on the basis of information about the road gradient as received from the information transmission means.

In the prior art, when any gradient exists in a road, the vehicle speed increases or decreases as compared with that in the case of traveling on a flat road, and hence, vehicle speed control conforming to a control plan becomes impossible. In contrast, according to the present invention, the distance deviation or the speed deviation at the anticipated arrival point of the vehicle after the predetermined time period is corrected on the basis of the road gradient, whereby the influence of the road gradient is compensated for, and control conforming to the control plan can be realized.

The predetermined time period is set at 1.5 seconds in one embodiment, but it is appropriately alterable in accordance with the capability of the arithmetic unit of the system or the required precision of the control.

The anticipated arrival point is calculated on the basis of the vehicle position, a first-order differential value of the vehicle position and a second-order differential value of the vehicle position. The anticipated arrival point can thus be accurately calculated merely by executing simple operations.

The information from the information transmission means is speed directive information relative to positions on the road. Thus, the vehicle can be driven at a preset speed along the road.

The deviation calculation means calculates the distance deviation and the speed deviation by comparing the information on the position and speed as received from the information transmission means, with the position and speed of the vehicle at the anticipated arrival point. The deviation between the target traveling state of the vehicle conforming to the control plan, and the actual traveling state of the vehicle, can thus be appropriately calculated.

The deviation calculation means calculates the distance deviation and the speed deviation by comparing the position and speed of the preceding vehicle after the predetermined time period as calculated on the basis of the positional information received from the preceding vehicle, with the position and speed of the vehicle at the anticipated arrival point. Thus, the vehicle can be driven following the preceding vehicle.

The position and speed of the preceding vehicle after the predetermined time period, are calculated on the basis of a first-order differential value and second-order differential value of the positional information received from the preceding vehicle. The position and speed of the preceding vehicle after the predetermined time period, can thus be accurately calculated merely by executing simple operations.

BRIEF DESCRIPTION OF THE DRAWINGS

FIG. 4 is a flow chart for explaining an operation thereof.

DETAILED DESCRIPTION OF THE PREFERRED EMBODIMENT

The present invention is directed to a motor vehicle which autonomously travels on a road for autonomous traveling along a path defined by magnetic nails functioning as magnetic information sources. The magnetic nails are embedded at predetermined intervals along the center of a traffic lane, and a motor vehicle which autonomously travels and follows a preceding vehicle while keeping a predetermined inter-vehicular distance relative to the preceding vehicle.

Figure 1:
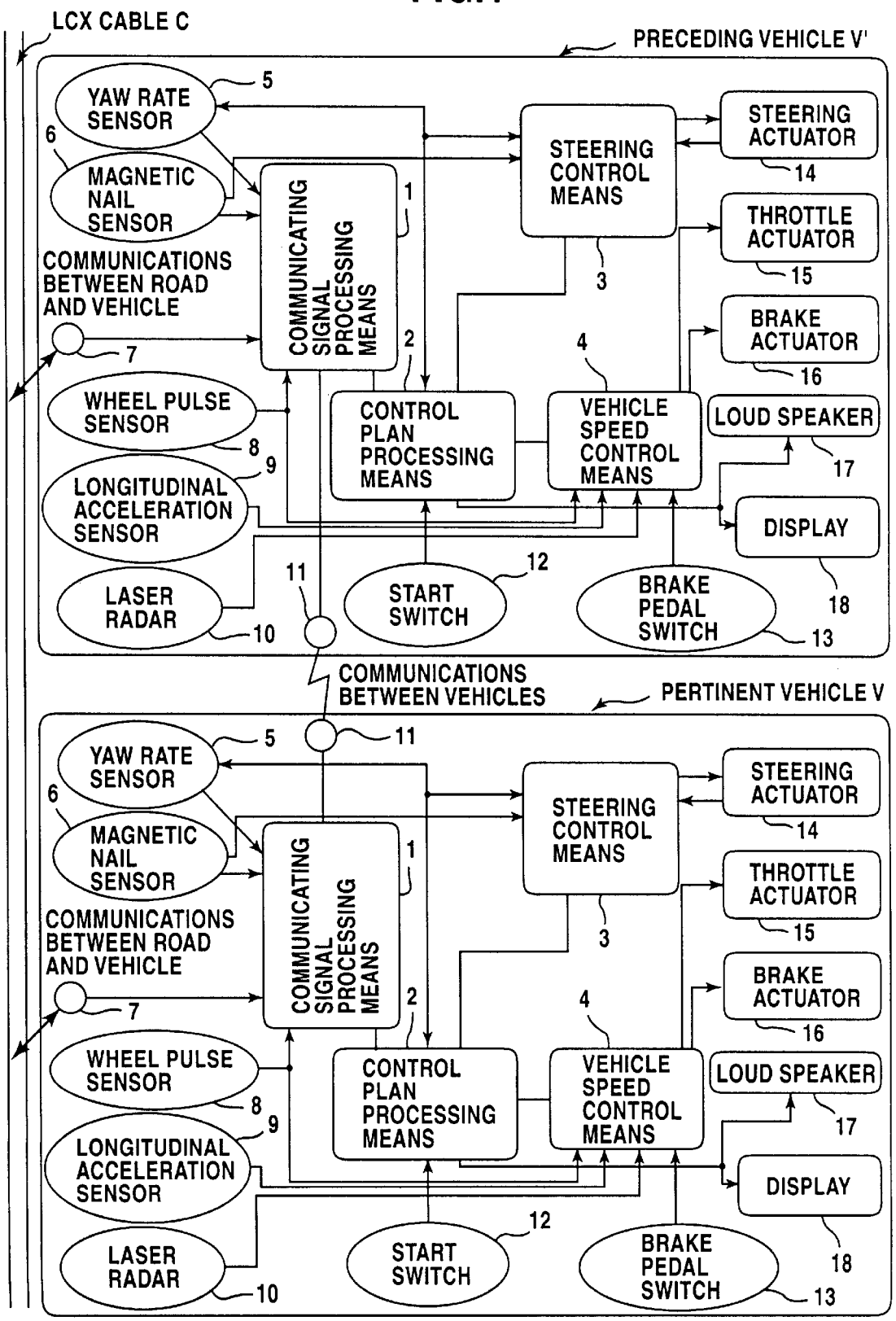
FIG. 1 is a diagram of the overall system for a motor vehicle, including an embodiment of the present invention.

FIG. 1 illustrates the overall construction of the preceding vehicle V' and the vehicle V. Since the constructions of the preceding vehicle V' and the vehicle V are substantially the same, the vehicle V shall be taken as an example in the ensuing description.

The vehicle V includes communication signal processing means 1, control plan processing means 2, steering control means 3 and vehicle speed control means 4 as modules in which signal processors (CPUs) are respectively mounted.

The communication signal processing means 1 executes the inter-vehicular communications between the vehicle V and the preceding vehicle V', the transmission and reception between the vehicle and a leakage coaxial cable C laid along the road, and the calculation of the position of the vehicle based on road data. Incidentally, the road data is formed from the data of a train of magnetic information sources (a traveling line) on a map. The data may be stored in a storage device beforehand, or may be externally received in predetermined traveling zones by way of communication.

The control plan processing means 2 creates information for autonomous traveling, through the actuation of an autonomous-traveling start switch 12. The control plan processing means 2 creates a vehicle speed plan along the train of magnetic information sources (the traveling line), on the basis of a speed command received from the leakage coaxial cable C, and calculates the deviation (error) of a current position and a directional deviation (error) relative to the magnetic information source lying just under the vehicle V and a positional deviation (error) as well as a directional deviation (error) relative to the magnetic information source lying at an anticipated arrival point after a predetermined time period of T seconds. The results of the calculations are utilized for the steering control of the vehicle V, and also for the correction of the acceleration/deceleration of the vehicle V. The predetermined time period is set at 1.5 second in this embodiment, and it should preferably be set between 1 and 2 seconds. Further, in the succeeding vehicle which follows the preceding vehicle V', inter-vehicular distances and inter-vehicular speed differences at the anticipated arrival point of the succeeding vehicle after T seconds and at the anticipated arrival point of the preceding vehicle V' after T seconds are calculated, and the results of the calculations are utilized for the correction of the acceleration/deceleration of the pertinent vehicle V.

Further, in the case of the succeeding vehicle, the control plan processing means 2 outputs data such as the speed of the vehicle and the preceding vehicle, the inter-vehicular distance of the vehicle to the preceding vehicle, and the configurations of the road and the traffic lane ahead of the vehicle, to a display 18 and a loudspeaker 17. On the other hand, in the case of the preceding vehicle, the control plan processing means 2 outputs data such as the speed of the vehicle and the succeeding vehicle, the inter-vehicular distance of the vehicle to the succeeding vehicle, and the configurations of the road and the traffic lane ahead of the vehicle, to a display 18 and a loudspeaker 17 in the vehicle.

The steering control means 3 calculates the directive signal of a steering angle on the basis of the output results of the control plan processing means 2, to control an actuator 14 which is disposed in a steering-operation transmission system. Steering is automatically controlled by the actuator 14, to drive the vehicle along the train of magnetic information sources (the traveling line).

The vehicle speed control means 4 calculates an acceleration directive signal on the basis of the vehicle speed plan and correction data of the control plan processing means 2 and sensor signals to be explained later, to thereby control a throttle actuator 15 and a brake actuator 16. The actuators 15 and 16 operate the throttle and the brake to accelerate or decelerate the vehicle V. A brake pedal switch 13 is connected to the vehicle speed control means 4, and the vehicle speed control is cancelled when stepping on the brake pedal 13 has been detected.

Also mounted on the vehicle V are a yaw rate sensor 5, a magnetic sensor 6 for detecting the magnetic information sources embedded in the surface of the road, a wheel pulse sensor 8, a longitudinal acceleration sensor 9, a laser radar 10, communication means 7 for transmission to and reception from the leakage coaxial cable C, and inter-vehicular communication means 11.

Speed command information, road curvature information, traffic jam information, emergency messages, etc. are received from the leakage coaxial cable C as stated before, while the ID No. of the vehicle V is transmitted from the side of the vehicle V. The traveling positions of the respective motor vehicles are determined from the ID Nos. on the side of the leakage coaxial cable C.

Traveling distance, vehicle speed and longitudinal acceleration data (control plan data) are transmitted and received over the inter-vehicular communications. In the case of the succeeding vehicle, the position and traveling situation (speed and acceleration) of the preceding vehicle are detected by the inter-vehicular communications, and they are utilized for creating the correction data of the follow-up control.

The yaw rate sensor 5 detects the angular velocity of the motor vehicle in the lateral direction thereof, and outputs the resulting detection signal to the communication signal processing means 1, control plan processing means 2 and steering control means 3.

Figure 2:
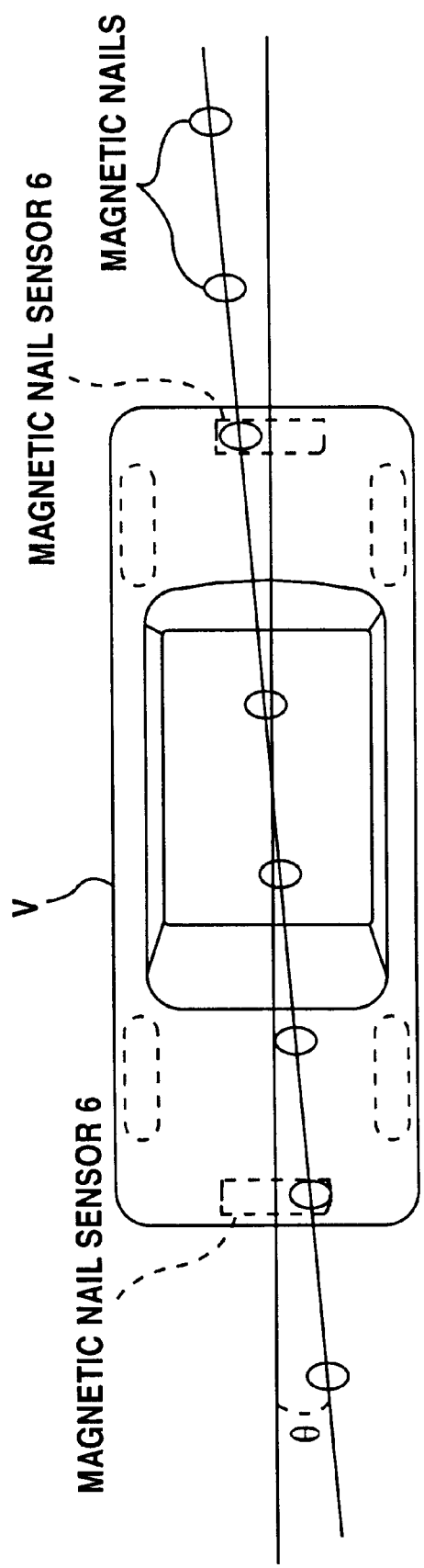
FIG. 2 is a diagram for explaining magnetic nails and magnetic sensors used with the embodiment of the present invention.

The magnetic sensors 6 are attached under the front bumper and rear bumper of the motor vehicle, and they measure sensor positions (vehicle positions) relative to the magnetic nails which are the magnetic information sources disposed at intervals of 1 m in the traffic lane of the road. The sensors measure the sensor position within limits of about 45 cm to the sides of the centers of the magnetic information sources. In this embodiment, as shown in FIG. 2, the magnetic sensors 6 are disposed under the front bumper and rear bumper of the motor vehicle, and an angle (error angle) defined between the train of magnetic information sources (the traveling line) and the vehicle V is also detected on the basis of the lateral position data detected by these sensors 6. In addition, the outputs from the magnetic sensors 6 are counted during traveling and are used for the calculation of the traveling distance. In this embodiment, bit information based on the inversion of the polarity of the magnetic information source is set every 500 m of the train of magnetic information sources, and the position is corrected with the bit information.

The wheel pulse sensor 8 is employed for calculating the traveling distance of the motor vehicle. The mere detection of the traveling distance by the magnetic sensors 6 may be insufficient because magnetic detection is impossible due to, for example, the wide departure of the vehicle from the scheduled traveling lane. On such an occasion, the wheel pulse sensor 8 is employed.

The longitudinal acceleration sensor 9 detects the current acceleration of the motor vehicle, and is utilized for vehicle speed control. Although the vehicle acceleration is also obtained from the output signals of the magnetic sensors 6, the sensor 9 is employed for calculating the acceleration in the same case as stated above where magnetic detection is impossible due to, for example, the wide departure of the vehicle from the scheduled traveling lane.

The laser radar 10 detects the preceding vehicle V' or an obstacle ahead of the vehicle and calculates a distance to the object, and then, outputs the calculated distance to the vehicle speed control means 4. On the basis of the output, the brake is controlled according to the situation by the vehicle speed control means 4. The position of the preceding vehicle V' is obtained with the inter-vehicular information, and the detection of the preceding vehicle V' and the calculation of the inter-vehicular distance can be effected more reliably due to the installation of the laser radar 10.

Figure 3:
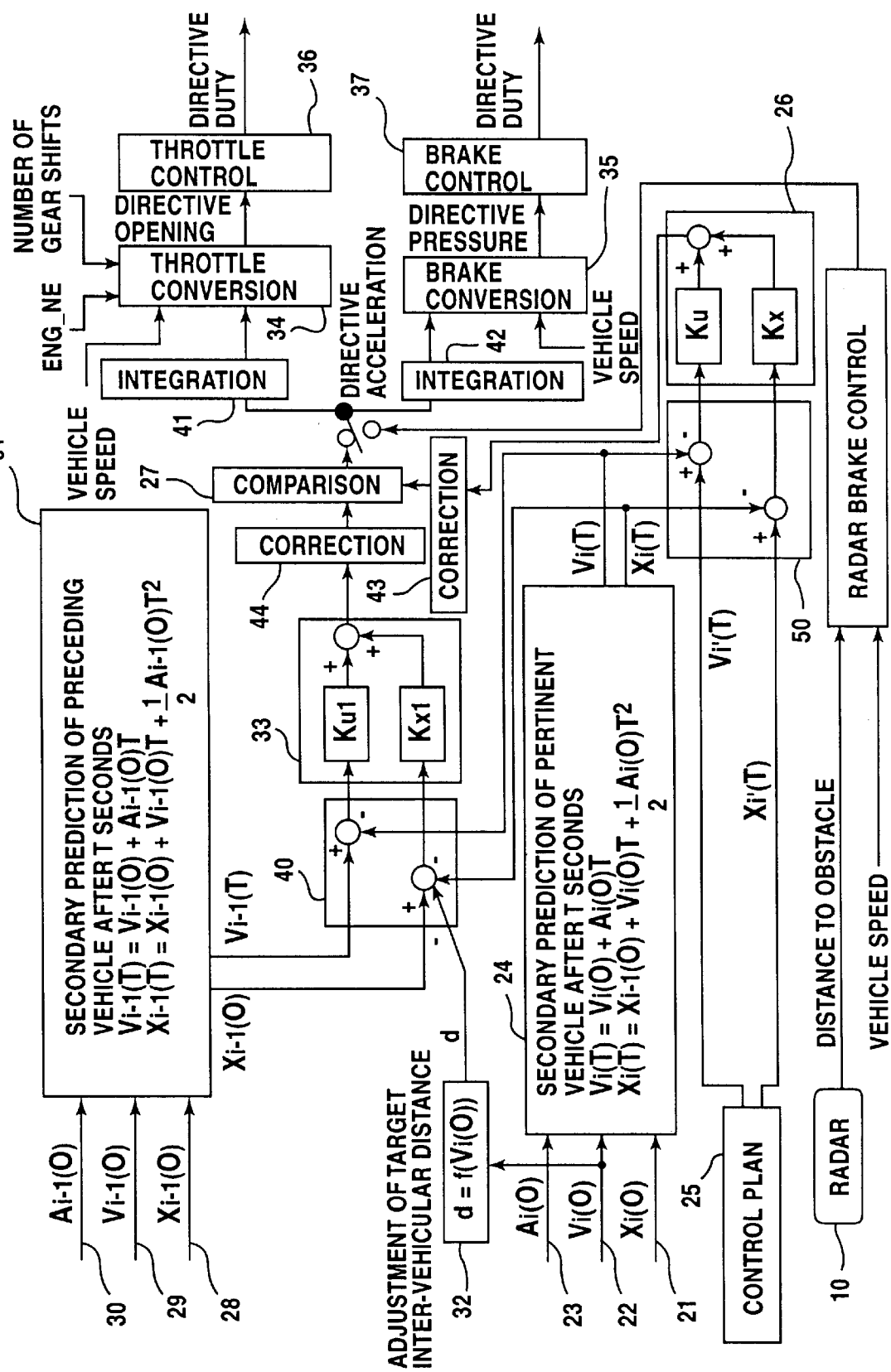
FIG. 3 is a block diagram of a control system of the embodiment of the present invention.

Next, the operation of the embodiment of the present invention will be described with reference to a block diagram of FIG. 3 and a flow chart of FIG. 4.

Figure 5:
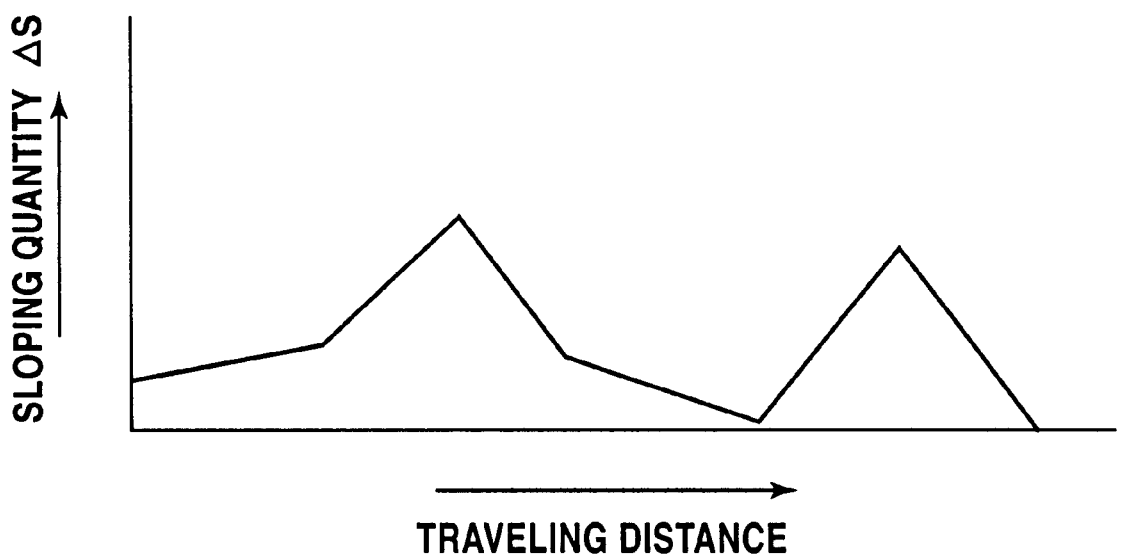
FIG. 5 is a graph showing the sloping-quantity map of a road.

First, at Step S1, the communication means 7 receives data including the amount of slope ΔS of the road, from the leakage coaxial cable C, and at the subsequent Step S2, the map data (refer to FIG. 5) of the sloping quantities ΔS for the respective magnetic information sources is created. At the next Step S3, the longitudinal acceleration of the vehicle V is loaded from the longitudinal sensor 9, and at the subsequent Step S4, the longitudinal acceleration is corrected with the sloping quantity ΔS at the position of the vehicle, as searched for from the map data. Letting $A_i(0)$ denote the longitudinal acceleration detected by the longitudinal sensor 9, the corrected value thereof is calculated as $A_i(0) \leftarrow A_i(0) - a\Delta S$ by the use of a correction coefficient $\underline{a}$ and the sloping quantity ΔS. Thus, even when the output of the longitudinal acceleration sensor 9 is influenced by the component of the gravitational acceleration in the direction of the surface of the road as is attributed to the inclination of the road, the influence is compensated for, to realize a calculation of the correct longitudinal acceleration. Thus, the accurate longitudinal acceleration can be calculated even in the case where magnetic detection is impossible due to a wide departure of the vehicle V from the scheduled traveling lane.

At the subsequent Step S5, a target acceleration is calculated as follows. First, the position $X_i(0)$ 21 of the vehicle, the speed $V_i(0)$ 22 thereof (the first-order differential value of the vehicle position) and the acceleration $A_i(0)$ 23 thereof (the second-order differential value of the vehicle position) as based on the detection signals of the magnetic sensors 6, are calculated by the control plan processing means 2, and they are outputted to the first processing portion 24 of the vehicle speed control means 4 for predicting the state of the vehicle V after T seconds.

In the first processing portion 24, the predicted position $X_i(T)$ of the vehicle after T seconds and the predicted speed $V_i(T)$ thereof after T seconds are calculated by the following equations:

$$X_i(T) = X_i(0) + V_i(0) \times T + \tfrac{1}{2} \times A_i(0) \times T^2$$

$$V_i(T) = V_i(0) + A_i(0) \times T$$

In the control plan processing portion 25 of the control plan processing means 2, a vehicle speed plan along the train of magnetic information sources (the traveling line) is created on the basis of a speed command from the leakage coaxial cable C, and the created vehicle speed plan is outputted together with the target position $X_i'(T)$ and target speed $V_i'(T)$ of the vehicle after T seconds.

In deviation calculation means 50, the distance $X_i(T)$ and speed $V_i(T)$ are subtracted from the target position $X_i'(T)$ and target speed $V_i'(T)$ calculated by the control plan processing portion 25, whereby a positional error and a speed error are respectively calculated.

The positional error and speed error are respectively multiplied by acceleration control gains Kx and Ku and are thereafter added in a control-plan-data conversion portion 26, and the resulting sum is outputted as the target acceleration to correction means 43. That is, the target acceleration is given by the following equation:

$$\text{Target acceleration} = Kx \times \{X_i'(T) - X_i(T)\} + Ku \times \{V_i'(T) - V_i(T)\}$$

Meanwhile, when the errors are multiplied by the acceleration control gains Kx and Ku in the control-plan-data conversion portion 26, the acceleration control gains Kx and Ku are set assuming that the vehicle V is traveling on a flat road. Nevertheless, the actual acceleration of the vehicle V is influenced by a gravitational acceleration due to the inclination of the road, so that the acceleration decreases on an ascending slope and increases on a descending slope. At Step S6, therefore, the correction means 43 corrects the target acceleration on the basis of a sloping quantity ΔS retrieved from an inclination map, in order to compensate for the influence of the gravitational acceleration due to the inclination of the road. That is, the target acceleration is corrected as (Target acceleration←Target acceleration+bΔS) by the use of a correction coefficient $\underline{b}$ and the sloping quantity ΔS. Thus, the influence of the inclination of the road is compensated for, and a control is realized so that the speed of the vehicle V correctly agrees with the speed command from the leakage coaxial cable C.

The position data $X_{i-1}(0)$ 28, speed data (differential value of the preceding-vehicle position) $V_{i-1}(0)$ 29 and acceleration data (second-order differential value of the preceding-vehicle position) $A_{i-1}(0)$ 30 of the preceding vehicle V' as based on the inter-vehicular communications, are outputted to a second processing portion 31 which predicts the state of the preceding vehicle V' after T seconds.

In the second processing portion 31, the predictive position $X_{i-1}(T)$ of the preceding vehicle V' after T seconds and the predictive speed $V_{i-1}(T)$ thereof, after T seconds are calculated by computations similar to those of the first processing portion 24 explained above. Deviation calculation means 40 subtracts the predictive position $X_i(T)$ and predictive speed $V_i(T)$ of the vehicle V after T seconds from the predictive position $X_{i-1}(T)$ and predictive speed $V_{i-1}(T)$ of the preceding vehicle V' after T seconds, respectively, thereby calculating the inter-vehicular distance as a distance deviation and the inter-vehicular speed as a speed deviation.

Target inter-vehicular-distance adjustment means 32 is provided for the purpose of correcting the inter-vehicular distance in accordance with the vehicle speed $V_i(0)$ 22. This means is employed for adjusting the speed during an initial traveling term or a terminal traveling term, and it corrects the excessive approach at a low speed in a case where the inter-vehicular distance is set at a value proportional to the speed. The target inter-vehicular-distance adjustment means 32 becomes unnecessary depending on methods of setting the inter-vehicular distance.

The calculated inter-vehicular distance and inter-vehicular speed are respectively multiplied by acceleration control gains $Kx_1$ and $Ku_1$ in a conversion portion 33 and are thereafter added. The target acceleration is calculated by the following equation:

$$\text{Target acceleration} = Kx_1 \times \{X_{i-1}(T) - X_i(T)\} + Ku_1 \times \{V_{i-1}(T) - V_i(T)\}$$

The target acceleration is corrected in correction means 44 for the purpose of compensating for the influence of the inclination of the road as in the foregoing, and is thereafter outputted to a comparison portion 27. In the comparison portion 27, the target acceleration based on the predictive deviations of the vehicle V after T seconds, as stated above, and the target acceleration based on the inter-vehicular distance and inter-vehicular speed with respect to the preceding vehicle V', as stated above, are compared, and either of them requiring a greater correction is selected and is outputted as correction data to a throttle integrator 41 and a brake integrator 42. The integral values of the correction data are outputted to throttle-control conversion means 34 and brake-control conversion means 35, and a throttle control portion 36 and a brake control portion 37 output directive commands to the actuator 15 of the throttle and the actuator 16 of the brake, to perform feedforward controls, respectively (refer to Steps S7 and S8).

Regarding the comparison portion 27, it is also permitted by way of example, for the correction data from the conversion means 26 to be outputted to the preceding vehicle V', while the correction data from the conversion means 33 is outputted to the vehicle (the succeeding vehicle) V.

The steering control means 3 (refer to FIG. 1) calculates the displacement magnitude of the vehicle position from the magnetic information sources and a displacement angle in the traveling direction of the vehicle, relative to a tangential line to the scheduled traveling line as based on a current-position curvature signal received from the leakage coaxial cable C. The steering control means 3 also calculates the positional error between a target point and an anticipated arrival point at a predetermined distance ahead of the vehicle as calculated on the basis of the "road configuration (road curvature) ahead" data of path data explained above, and a displacement angle in the traveling direction of the vehicle, relative to the scheduled traveling line. Then, the steering control means 3 drives the actuator 14 of a steering device on the basis of the calculated values, in order to drive the vehicle V along the train of magnetic information sources (the traveling line).

By way of example, although the control is performed in the embodiment on the basis of the distance deviation and speed deviation at the vehicle position after the predetermined time period, control can also be performed on the basis of either of the distance deviation and speed deviation.

As described above, according to the present invention, correction means are provided for correcting at least either of a distance deviation and a speed deviation in order to compensate for any deviation attributable to a road inclination, on the basis of information about the road gradient as received from information transmission means. Thus, the influence of the road gradient can be compensated for to realize a control conforming to a control plan.

An anticipated arrival point is calculated on the basis of a vehicle position, the first-order differential value of the vehicle position and the second-order differential value of the vehicle position, so that the anticipated arrival point can be accurately calculated merely by executing simple operations.

Information from information transmission means is speed directive information relative to positions on a road, so that a motor vehicle can be driven at a preset speed along the road.

Deviation calculation means calculates a distance deviation and a speed deviation by comparing the information of a position and speed received from information transmission means, with the position and speed of a vehicle at an anticipated arrival point, so that the deviation between the target traveling state of the vehicle conforming to a control plan, and the actual traveling state of the vehicle, can be appropriately calculated.

Deviation calculation means calculates a distance deviation and a speed deviation by comparing the position and speed of a preceding vehicle after a predetermined time period, as calculated on the basis of positional information received from the preceding vehicle, with the position and speed of a vehicle at an anticipated arrival point, so that the vehicle can be driven following the preceding vehicle.

The position and speed of a preceding vehicle after a predetermined time period are calculated on the basis of the first-order differential value and second-order differential value of positional information received from the preceding vehicle. Thus, the position and speed of the preceding vehicle after the predetermined time period, can be accurately calculated merely by executing simple operations.

While, in the above, the embodiment of the present invention has been described in detail, the present invention can be subjected to various design alterations within a scope not departing from the purport thereof.

What is claimed is:

1. In an autonomous traveling vehicle having acceleration/deceleration actuators, a vehicle control system comprising:

vehicle position detection means for detecting the position of a vehicle on the basis of information received from information sources disposed on a road;

control plan processing means for creating a control plan formed of correlation data of speed and distance, on the basis of at least one of information received from a preceding vehicle and information received from information transmission means disposed on or near the road;

deviation calculation means for calculating at least one of a distance deviation and a speed deviation at an anticipated arrival point of the vehicle after a predetermined time period, on the basis of the control plan and the vehicle position;

vehicle-speed control means for controlling the accelerating/decelerating actuators on the basis of at least one of the distance deviation and the speed deviation; and correction means for correcting at least one of the distance deviation and the speed deviation in order to compensate for any deviation due to a gradient of the road, on the basis of information about the road gradient as received from the information transmission means.

2. An autonomous traveling vehicle as defined in claim 1, wherein the anticipated arrival point is calculated on the basis of the vehicle position, a first-order differential value of the vehicle position and a second-order differential value of the vehicle position.

3. An autonomous traveling vehicle as defined in claim 1, wherein the information from the information transmission means is speed directive information relative to positions on the road.

4. An autonomous traveling vehicle as defined in claim 1, wherein the deviation calculation means calculates the distance deviation and the speed deviation by comparing the information on the position and speed as received from the information transmission means, with the position and speed of the vehicle at the anticipated arrival point.

5. An autonomous traveling vehicle as defined in claim 1, wherein the deviation calculation means calculates the distance deviation and the speed deviation by comparing the position and speed of the preceding vehicle after the predetermined time period, as calculated on the basis of the positional information received from the preceding vehicle, with the position and speed of the vehicle at the anticipated arrival point.

6. An autonomous traveling vehicle as defined in claim 5, wherein the position and speed of the preceding vehicle after the predetermined time period, are calculated on the basis of a first-order differential value and second-order differential value of the positional information received from the preceding vehicle.

* * * * *